US008766968B2

(12) United States Patent
Lee et al.

(10) Patent No.: US 8,766,968 B2

(45) Date of Patent: Jul. 1, 2014

(54) DISPLAY DEVICE AND A DRIVING METHOD THEREOF

(75) Inventors: Min Joo Lee, Seoul (KR); Po-Yun Park, Asan-si (KR); Jung Hwan Cho, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 233 days.

(21) Appl. No.: 13/344,198

(22) Filed: Jan. 5, 2012

(65) Prior Publication Data

US 2013/0027379 A1 Jan. 31, 2013

(30) Foreign Application Priority Data

Jul. 25, 2011 (KR) ........................ 10-2011-0073538

(51) Int. Cl.
*G06F 3/038* (2013.01)

(52) U.S. Cl.
USPC ............ 345/212; 345/211; 345/214; 345/634

(58) Field of Classification Search
USPC ........... 345/87, 208, 212, 419, 690, 211, 214, 345/634; 348/552
See application file for complete search history.

(56) References Cited

U.S. PATENT DOCUMENTS 5,327,156 A * 7/1994 Masukane et al. ............ 345/634
6,040,814 A 3/2000 Murakami et al.
6,628,340 B1 * 9/2003 Graczyk et al. ............... 348/552
6,940,500 B2 9/2005 Washio et al.
2007/0229418 A1 * 10/2007 Yun et al. ........................ 345/87
2008/0042930 A1 2/2008 Yu et al.
2008/0091974 A1 4/2008 Nakashima
2008/0106542 A1 5/2008 Park et al.
2011/0001744 A1 * 1/2011 Chen et al. .................... 345/212
2011/0063271 A1 * 3/2011 Yun et al. ...................... 345/208
2011/0122166 A1 * 5/2011 Peng et al. .................... 345/690
2011/0285697 A1 * 11/2011 Lee et al. ...................... 345/419

FOREIGN PATENT DOCUMENTS

| | | |
|---|---|---|
| JP | 2003-044011 | 2/2003 |
| JP | 3638271 | 1/2005 |
| JP | 4311238 | 5/2009 |
| KR | 10-0319196 | 12/2001 |
| KR | 1020040102918 | 12/2004 |
| KR | 10-0551735 | 2/2006 |
| KR | 1020090120359 | 11/2009 |
| KR | 10-0986041 | 10/2010 |

* cited by examiner

*Primary Examiner* — Thuy Pardo
(74) *Attorney, Agent, or Firm* — F. Chau & Associates, LLC

(57) ABSTRACT

A display device including a display panel, a gate driver, a data driver and a signal controller. The display panel includes gate lines and data lines, the gate driver is connected to the gate lines, the data driver is connected to the data lines and the signal controller controls the display panel, the gate driver, and the data driver. The signal controller includes a timing controller and a low voltage differential signaling (LVDS) receiving unit. The timing controller includes a frame memory. The display device further includes an analog-to-digital (AD) board including an LVDS transmission unit, wherein the LVDS transmission unit transmits a signal identifying a stopped image or a moving image to the LVDS receiving unit, and in response to the signal identifying the stopped image, the signal controller maintains the display of the same image on the display panel by using the frame memory.

19 Claims, 15 Drawing Sheets

DISPLAY DEVICE AND A DRIVING METHOD THEREOF

CROSS-REFERENCE TO RELATED APPLICATION

This application claims priority under 35 U.S.C. §119 to Korean Patent Application No. 10-2011-0073538 filed in the Korean Intellectual Property Office on Jul. 25, 2011, the disclosure of which is incorporated by reference herein in its entirety.

BACKGROUND

1. Technical Field

The present invention relates to a display device and a driving method thereof.

2. Discussion of the Related Art

Display devices may include flat panel display devices of various types such as a liquid crystal display, an organic light emitting diode display, an electrophoretic display, and a plasma display. In general, a display device includes a display panel, a driving chip for driving the display panel, and a printed circuit board on which a system controller and the driving chip are mounted.

In the display device field, high speed and high bandwidth data transmission between components, such as the driving chip, the printed circuit board, and the system controller is desired. This may be accomplished by using a low voltage differential signaling (LVDS) method. LVDS is an electrical digital signaling system that can run at very high speeds over twisted-pair copper cables. LVDS is a cost-effective solution for many applications that demand low power consumption and high noise immunity for high data rates.

An image displayed by the display device may be a moving image that is changed over time or a stopped image that remains still for a period of time. In the case of the stopped image, to reduce power consumption, a pixel self-refresh (PSR) technique may be used. However, the PSR technique does not work in a unidirectional communication method such as the LVDS method. Accordingly, there is a need to reduce power consumption when still images are displayed in the LVDS method.

SUMMARY

The present invention provides a display device for improving power consumption when displaying a stopped image in the low voltage differential signaling (LVDS) method of unidirectional communication, and a driving method thereof.

A display device according to an exemplary embodiment of the present invention includes: a display panel including gate lines and data lines; a gate driver connected to the gate lines; a data driver connected to the data lines; a signal controller controlling the display panel, the gate driver, and the data driver, the signal controller including a timing controller and a low voltage differential signaling (LVDS) receiving unit and the timing controller including a frame memory; and an analog-to-digital (AD) board including an LVDS transmission unit, wherein the LVDS transmission unit transmits a signal identifying a stopped image or a moving image to the LVDS receiving unit, and in response to the signal identifying the stopped image, the signal controller maintain the display of the same image on the display panel by using the frame memory.

The signal identifying the stopped image may use a reserved bit of an LVDS transmission method to identify the stopped image.

The identification of the stopped image may be based on reserved bits in more than two consecutive frames.

The signal identifying the stopped image may use a combination of at least two of a data enable (DE) signal, a vertical synchronization (VSYNC) signal, and a horizontal synchronization (HSYNC) signal of an LVDS transmission method.

The identification of the stopped image may be based on an overlap of a high period of the VSYNC signal and a high period of the HSYNC signal, or an overlap of a high period of the DE signal and the high period of the VSYNC signal and the high period of the HSYNC signal.

When the identification of the stopped image is based on the overlap of the high period of the DE signal, the high period of the VSYNC signal and the high period of the HSYNC signal identifying the stopped image may include data for a frequency of a clock that is used when displaying the same image.

The signal controller may operate the frame memory, when the same image is displayed, by using a first clock signal having a frequency that is lower than a frequency of a second clock signal used when a moving image is displayed on the display panel.

The signal controller may further include a phase-locked loop (PLL) unit receiving an oscillating clock signal from an outside source to generate the first and third clock signals and a control signal generator generating a control signal.

The PLL unit may not be operated when the moving image is displayed, and when the same image is displayed, the PLL unit may generate the first and third clock signals and the first clock signal may be transmitted to the frame memory and the third clock signal may be transmitted to the control signal generator.

The third clock signal may have the same frequency as the second clock signal.

A driving method of a display device according to an exemplary embodiment of the present invention includes: receiving, at an AD board, a stopped image signal from an outside source; transmitting a processed version of the stopping image signal from an LVDS transmission unit of the AD board to a signal controller; and repeatedly displaying, on a display panel, the same image base on the processed stopped image by using a frame memory disposed in the signal controller.

The processed stopped image signal may use a reserved bit of an LVDS transmission method as its identification.

The identification of the processed stopped image signal may be based on reserved bits in more than two consecutive frames.

The processed stopped image signal may use a combination of at least two of a DE signal, a VSYNC signal, and a HSYNC signal of an LVDS transmission method as its identification.

The identification of the processed stopped image signal may be based on an overlap of a high period of the VSYNC signal and a high period of the HSYNC signal, or an overlap of a high period of the DE signal, the high period of the VSYNC signal and the high period of the HSYNC signal.

When the identification of the processed stopped image signal is based on the overlap of the high period of the DE signal, the high period of the VSYNC signal and the high period of the HSYNC signal, the processed stopped image signal may include data for a frequency of a clock signal that is used when displaying the same image.

When repeatedly displaying the same image, the signal controller may operate the frame memory with a first clock signal having a frequency that is lower than a frequency of a second clock signal that is used when displaying a moving image.

When repeatedly displaying the same image, the signal controller generates a control signal and outputs the control signal to a control signal generator, wherein the control signal has the same frequency as the second clock signal.

A display device according to an exemplary embodiment of the present invention includes: a display panel displaying an image for a first frame; an LVDS receiving unit receiving LVDS data, wherein the LVDS data includes at least one bit indicating whether the LVDS data is for a still image or a moving image; and a frame memory storing image data corresponding to the displayed image, wherein when the LVDS data is for a still image, the frame memory provides the stored image data to the display panel to maintain the display of the image for a second frame.

The display device may further include a PLL unit providing a first clock to the frame memory and a second clock to a control signal generator in response to the LVDS data for the still image, wherein the first clock has a lower frequency than the second clock.

DETAILED DESCRIPTION OF THE EMBODIMENTS

Figure 1:
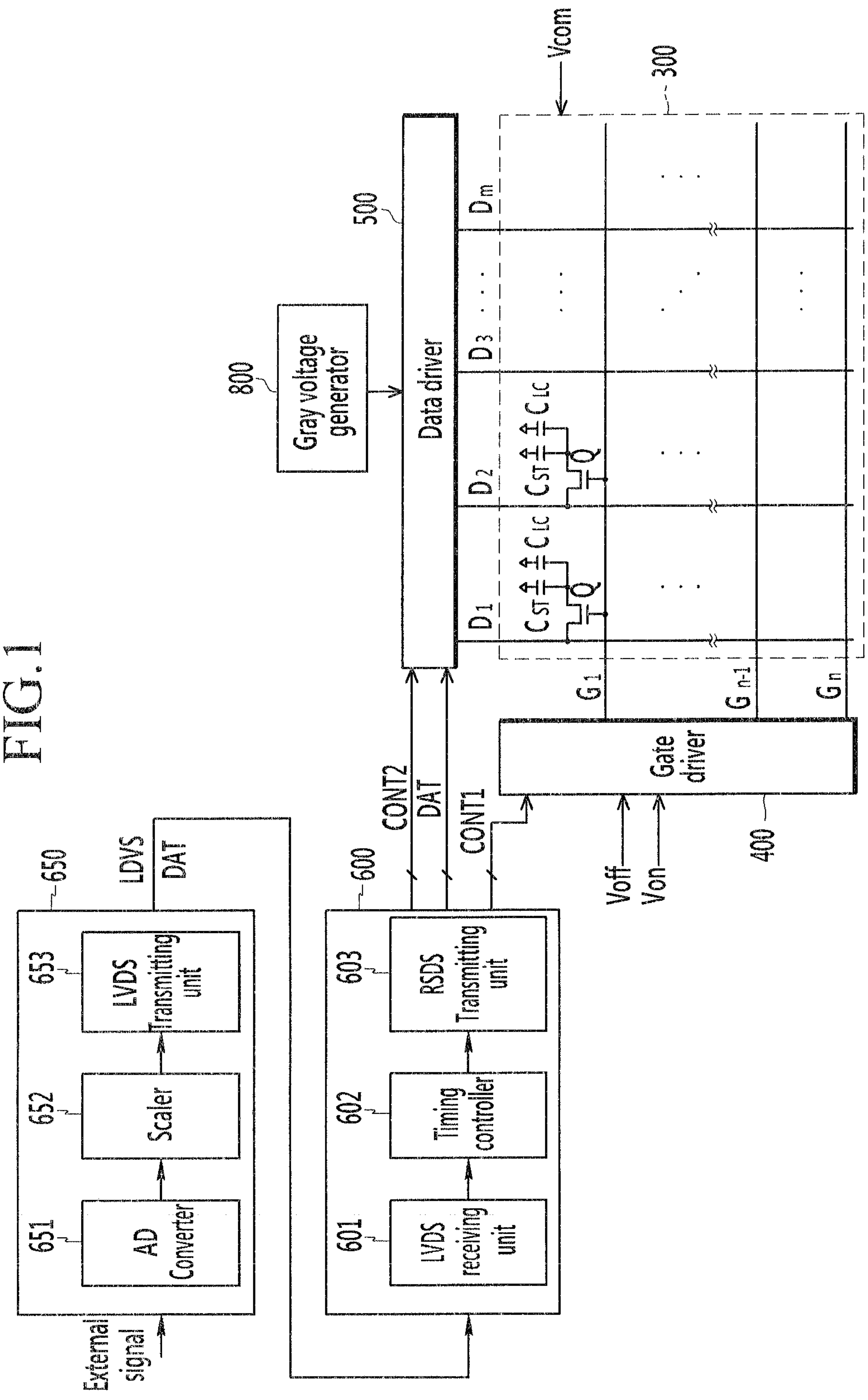
FIG. 1 is a block diagram of a display device according to an exemplary embodiment of the present invention.

Exemplary embodiments of the present invention will be described more fully hereinafter with reference to the accompanying drawings. However, the present invention may be embodied in various different ways and should not be construed as limited to the exemplary embodiments disclosed herein.

Certain aspects of the drawings may be exaggerated for clarity. Like reference numerals may designate like elements throughout the specification and drawings.

Now, a display device according to an exemplary embodiment of the present invention will be described with reference to FIG. 1.

FIG. 1 is a block diagram of a display device according to an exemplary embodiment of the present invention.

A display device according to an exemplary embodiment of the present invention includes a display panel 300, a gate driver 400, a data driver 500, a gray voltage generator 800, an analog/digital (AD) board 650, and a signal controller 600.

The display panel 300 of FIG. 1 includes a plurality of gate lines G1-Gn and a plurality of data lines D1-Dm, and the plurality of gate lines G1-Gn extend in a horizontal direction and the plurality of data lines D1-Dm intersecting the plurality of gate lines G1-Gn extend in a vertical direction.

A pixel is connected to one of the gate lines G1-Gn and one of the data lines D1-Dm, and the pixel includes a switching element Q connected to the gate line and the data line. The switching element Q includes a control terminal connected to the gate line, an input terminal connected to the data line, and an output terminal connected to a liquid crystal capacitor $C_{LC}$ and a storage capacitor $C_{ST}$.

The display panel 300 of FIG. 1 is a liquid crystal panel, however the display panel 300 to which the present invention may be applied may include various display panels such as an organic light emitting diode display panel, an electrophoretic display panel, and a plasma display panel.

The plurality of gate lines G1-Gn of the display panel 300 are connected to the gate driver 400, and the gate driver 400 alternately applies a gate-on voltage Von and a gate-off voltage Voff to the gate lines G1-Gn according to a control signal CONT1 of the signal controller 600.

The plurality of data lines D1-Dm of the display panel 300 are connected to the data driver 500, and the data driver 500 receives a control signal CONT2 and an image data DAT from the signal controller 600. The data driver 500 converts the image data DAT into a data voltage by using a gray voltage generated in the gray voltage generator 800, and transmits the data voltage to the data lines D1-Dm.

The AD board 650 includes an AD converter 651, a scaler 652, and a low voltage differential signaling (LVDS) transmission unit 653, and is a board that receives an external analog signal applied from the outside and converts it into a digital signal.

The AD converter 651 receives the external analog signal, which includes data, and converts it into the digital signal. The converted digital signal is input to the scaler 652, and is then input to the LVDS transmission unit 653 such that the data is re-aligned to be suitable for an LVDS method and is output as LVDS data LVDS DAT.

The signal controller 600 includes an LVDS receiving unit 601, a timing controller 602, and a reduced swing differential signaling (RSDS) transmission unit 603, and converts the LVDS data LVDS DAT input from the AD board 650 and outputs it with a predetermined method (e.g., an RSDS method) after a calculation.

The LVDS receiving unit 601 receives the LVDS data LVDS DAT and divides it into red, green, blue (RGB) image data, a data enable (DE) signal, a horizontal synchronization (HSYNC) signal, and a vertical synchronization (VSYNC) signal. The divided signals are input to the timing controller 602 and the RGB image data is calculated for a gamma characteristic, a response speed improvement, and a color feeling improvement, and the DE signal, the HSYNC signal, and the VSYNC signal are reference signals for displaying the image. Next, the divided signals are input to the RSDS transmission unit 603 and are converted by the RSDS method and output.

The external signal input to the AD board 650 may include a signal indicating a moving image signal or a stopped image signal. In the case of the moving image signal, input image information is processed for display by the display panel 300. In contrast, in the case of the stopped image signal, the input image remains the same such that the image previously displayed on the display panel 300 may continue to be displayed on the display panel 300. Here, the AD board 650 and the signal controller 600 do not perform the same processing that they perform when the moving image signal is received.

Accordingly, in an exemplary embodiment of the present invention, if the stopped image signal is input, the input image as the stopped image is provided to the signal controller 600 from the AD board 650 in the LVDS method (e.g., a unidirectional communication method) for the same image to be continuously displayed. When displaying the stopped image, the same image is displayed by using the image data input in the previous frame through a frame memory (referring, for example, to frame memory 622 of FIG. 8) included in the signal controller 600. In addition, when displaying the same image this way, it is not necessary for the AD board 650 to be operated and the LVDS transmission unit 653 does not output the LVDS data LVDS DAT such that power is not consumed for these actions. In addition, the stopped image may cause the same image to be displayed for a period of time such that the image is displayed even if the driving frequency is low, thereby enabling the lowering of the driving frequency for the display of the image.

A method according to an exemplary embodiment of the present invention, in which it is determined whether the image data provided from the LVDS transmission unit 653 of the AD board 650 to the signal controller 600 is for the moving image or the stopped image, will now be described.

Figure 2A:
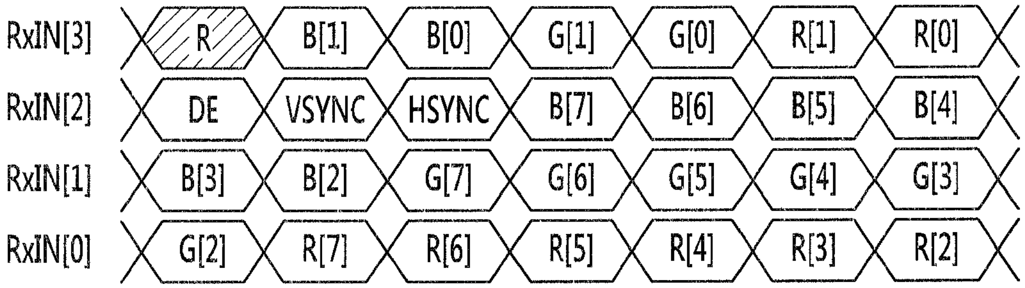
FIG. 2A and FIG. 2B each include a diagram of a data structure that is transmitted with a low voltage differential signaling (LVDS) method.
Figure 2B:
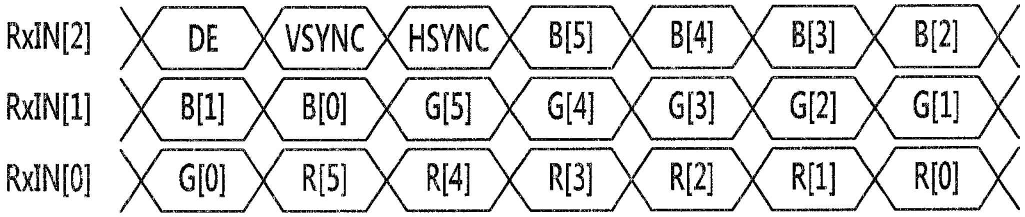
Figure 5:
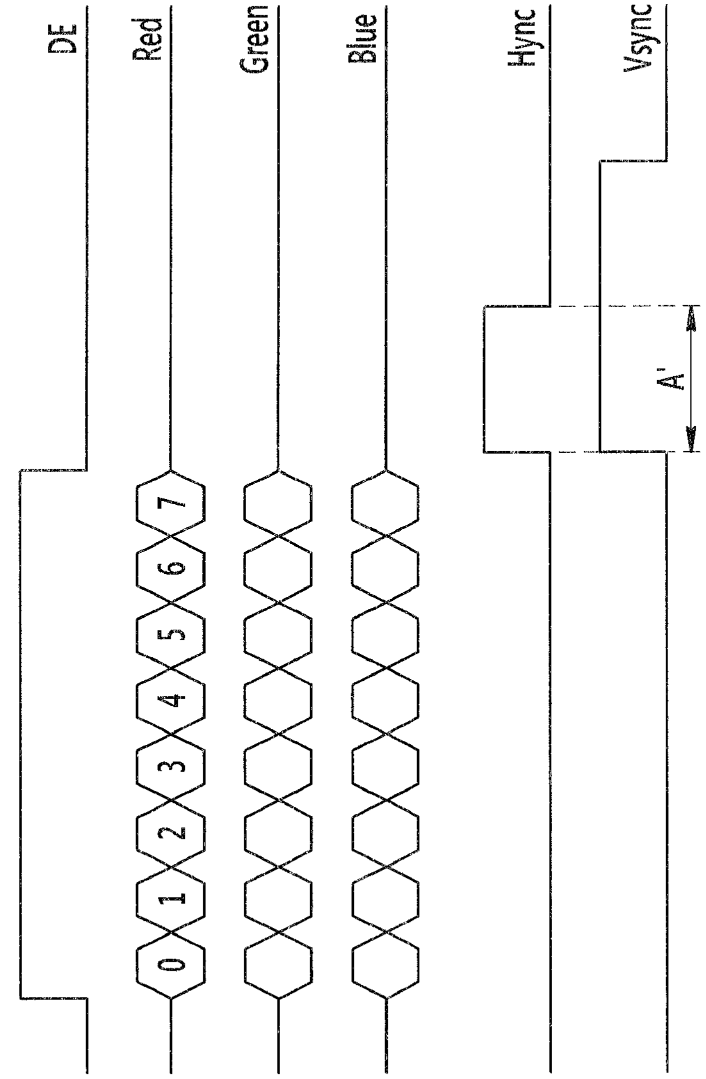
Figure 6:
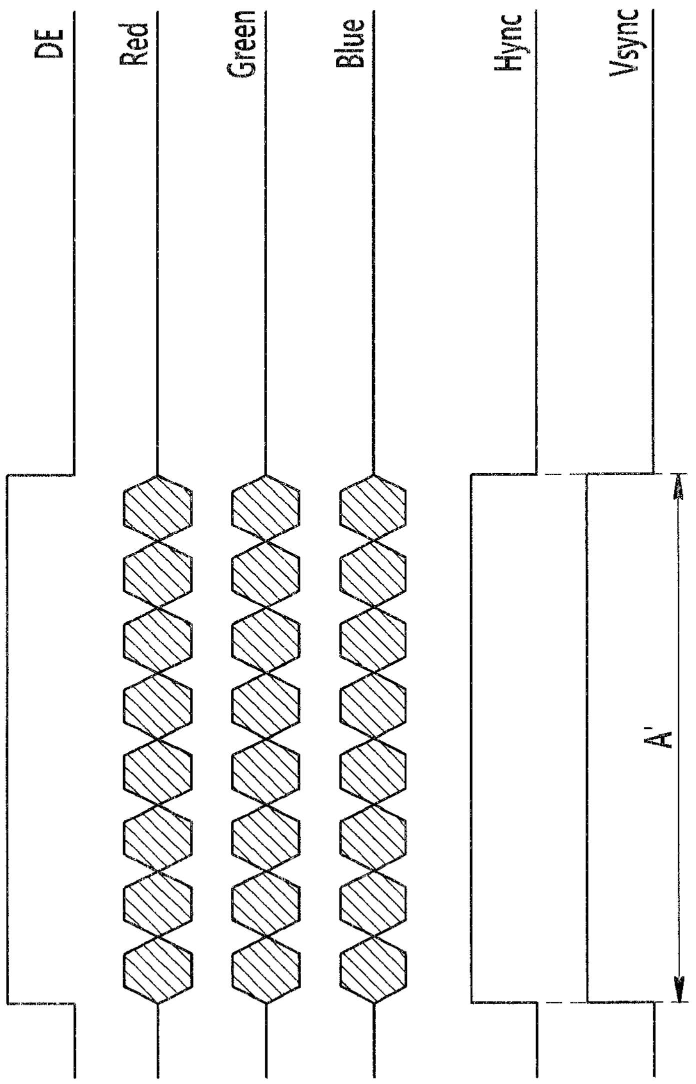
Figure 7:
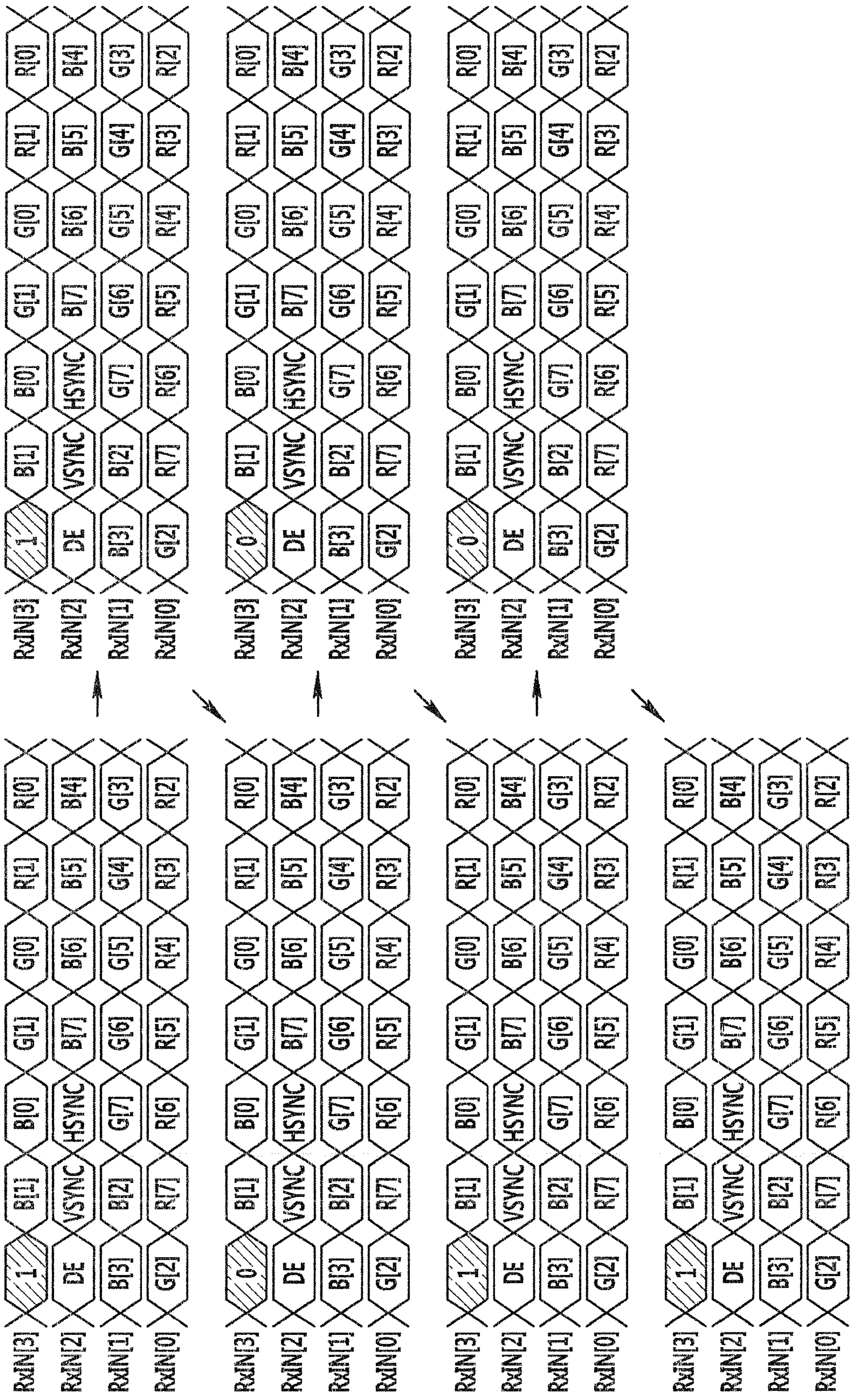
FIG. 7 is a diagram illustrating data that is changed from a stopped image to a moving image according to an exemplary embodiment of the present invention.

FIG. 2A and FIG. 2B each include a diagram of a data structure that is transmitted with an LVDS method, FIG. 3 to FIG. 6 are diagrams illustrating transmitting a stopped image according to an exemplary embodiment of the present invention, and FIG. 7 is a diagram illustrating data that is changed from a stopped image to a moving image according to an exemplary embodiment of the present invention.

FIG. 3, FIG. 5, FIG. 6, and FIG. 7 each show an example of a distinction signal showing whether the image data is the moving image or the stopped image.

FIG. 2A shows a data structure of the LVDS method of 8 bits, and FIG. 2B shows a data structure of the LVDS method of 6 bits.

Figure 3:
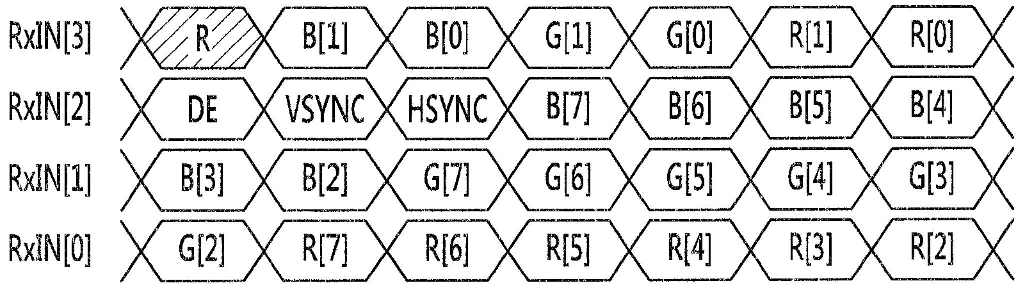
FIG. 3 to FIG. 6 are diagrams illustrating transmitting a stopped image according to an exemplary embodiment of the present invention.

Referring to FIG. 2A, the 8-bit LVDS data LVDS DAT includes a reserved bit R as well as the DE signal, VSYNC signal, HSYNC signal, and R, G, B image data R[0]-R[7], G[0]-G[7], and B[0]-B[7]. The reserved bit R is shown by a slashed line at the leftmost side of the RxIN[3] row of FIG. 2A. As described above, the 8-bit LVDS data LVDS DAT may indicate whether the image data is the stopped image or the moving image by using the reserved bit R and may transmit the reserved bit R to the signal controller 600. For example, as shown in FIG. 3, if 0 is applied to the reserved bit R, the image data is recognized as the stopped image, and differently, if 1 is applied to the reserved bit R, the image data is recognized as the moving image. In other words, the reserved bit R may be used as a distinction signal identifying whether the image data is the stopped image or the moving image.

In addition, if the reserved bit R is not used, as shown in FIG. 5 and FIG. 6, the stopped image may be identified by using the relation of the DE signal, the VSYNC signal, and the HSYNC signal.

Figure 4:
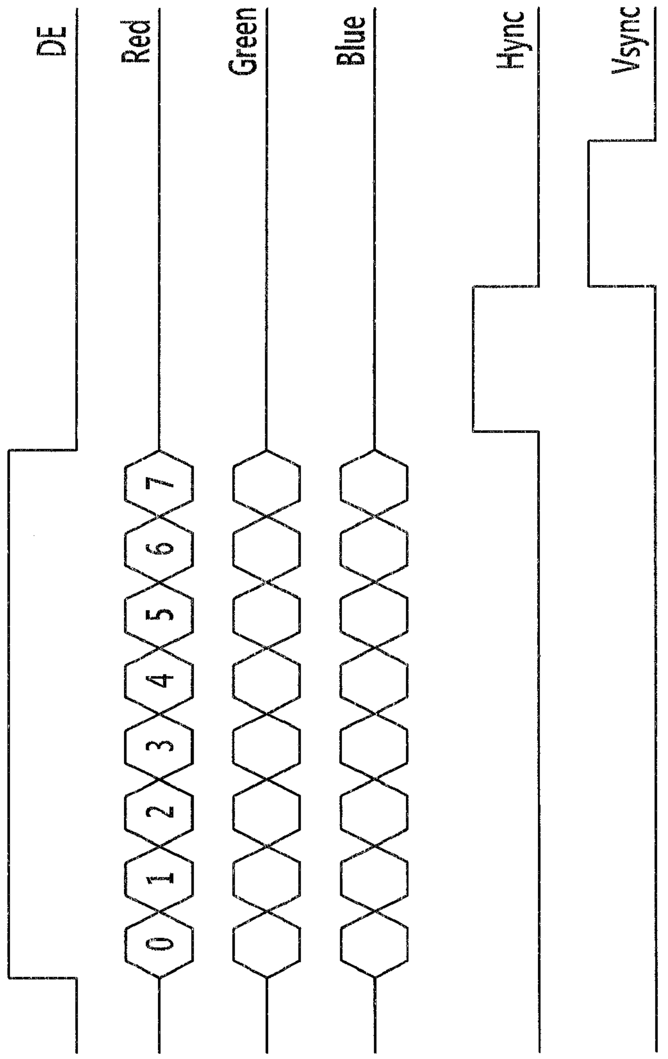

FIG. 4 to FIG. 6 show signal waveform diagrams in which the LVDS data LVDS DAT received in the LVDS receiving unit 601 of the signal controller 600 is divided for each signal, where FIG. 4 shows the case of the moving image, and FIG. 5 and FIG. 6 each show the case of the stopped image.

Referring to FIG. 4, to display the moving image data, which is input every frame, high periods of the DE signal, the VSYNC signal, and the HSYNC signal do not overlap each other. During the period in which the DE signal is high, the R, G, B image data are respectively input, the VSYNC signal and the HSYNC signal do not overlap the DE signal and the R, G, B image data, and further, the VSYNC signal and the HSYNC signal do not overlap each other.

However, in the case of the stopped image, it is not necessary to input the R, G, B image data to display the image such that overlap may occur.

For example, in the exemplary embodiments of FIG. 5 and FIG. 6 the distinction signals are formed by the relation of at least two signals among the DE signal, the VSYNC signal, and the HSYNC signal included in the LVDS data LVDS DAT.

FIG. 5 shows a case in which the high period of the VSYNC signal is increased, with respect to that shown in FIG. 4, and overlaps the high period of the HSYNC signal (referring to A' of FIG. 5), and FIG. 6 shows a case in which the VSYNC signal and the HSYNC signal overlap the high period of the DE signal (referring to A' of FIG. 6).

Particularly, like that shown in FIG. 6, if the VSYNC signal and the HSYNC signal are high during the high period of the DE signal in which the R, G, B image data is input, the R, G, B image data are not recognized as image data. Here, instead of the R, G, B image data, data for a low frequency clock that will be used to reduce power consumption in the signal controller 600 and the display panel 300 may be transmitted. The low frequency clock is indicated by "CLK2" in FIG. 10, and this will be described later with regard to FIG. 10.

As described above, according to FIG. 5 and FIG. 6, the distinction signal identifying whether the image data is the stopped image or the moving image may be made by using the relation of the DE signal, the VSYNC signal, and the HSYNC signal.

In the above description, the method of showing the stopped image with reference to the 8-bit LVDS data LVDS DAT was described with reference to FIG. 3, FIG. 5, and FIG. 6.

Next, a method of showing the stopped image with reference to the 6-bit LVDS data LVDS DAT will be described.

Referring to FIG. 2B, the 6-bit LVDS data LVDS DAT includes the DE signal, the VSYNC signal, the HSYNC signal, and the R, G, B image data R[0]-R[5], G[0]-G[5], B[0]-B[5], however the reserved bit is not present. As a result, when using the 6-bit LVDS data LVDS DAT, unlike that shown in FIG. 3, the stopped image may not be represented by using the reserved bit. However, the 6-bit LVDS data may be use the relation of the DE signal, the VSYNC signal, and the HSYNC signal like FIG. 5 and FIG. 6 to represent the stopped image or the moving image.

Figure 8:
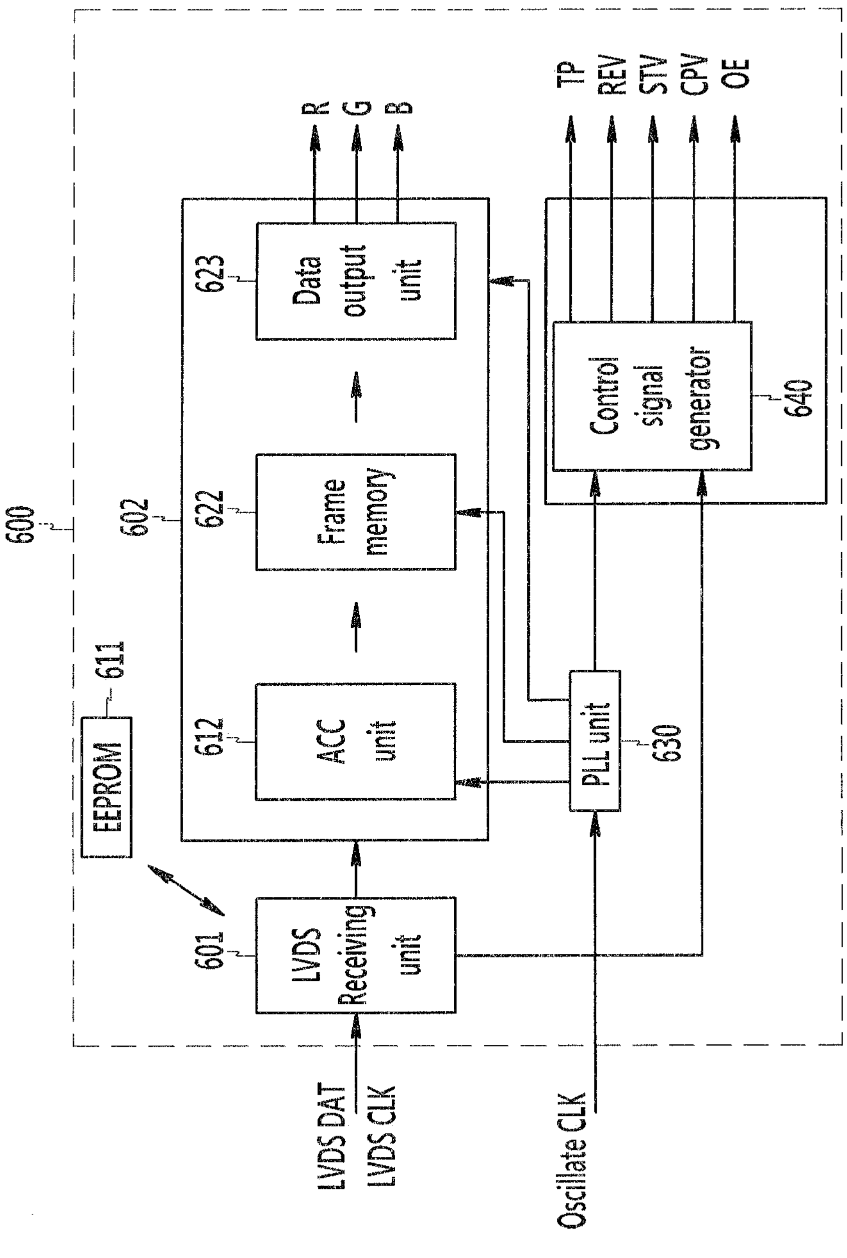
FIG. 8 is a block diagram of a display panel board according to an exemplary embodiment of the present invention.

If the stopped image starts to be displayed, the data stored in the frame memory, for example, the frame memory 622 of FIG. 8, is repeatedly displayed on the display panel 300. However, if the moving image starts to be input, a schedule of the input of the moving image is provided to the signal controller 600 via the LVDS transmission unit 653 of the AD board 650, and the signal controller 600 may be prepared to be changed into the mode that is suitable for the moving image.

FIG. 7 shows an example of informing the signal controller 600 of the change to the moving image by using the reserved bit that is continuously input in the 8-bit LVDS data LVDS DAT. In other words, the distinction signal according to the exemplary embodiment of FIG. 7 is made of the reserved bit provided in two or more continuous frames.

In FIG. 7, the value of the reserved bit input in 7 continuous frames is "1100101". Here, the data may be changed to the moving image without an error by using the combination of the value of the reserved hit that is continuously input for several frames. As shown in FIG. 3, it is possible to use one reserved bit; however, an error due to noise may not be generated by using the combination of reserved bits.

In addition, since the 6-bit LVDS data LVDS DAT does not include the reserved bit, as shown in FIG. 4, the DE signal, the VSYNC signal, and the HSYNC signal do not overlap, thereby displaying the moving image.

According to an exemplary embodiment of the present invention, the signal representing the stopped image or the signal representing the moving image may be used in one of the techniques shown in FIG. 3 to FIG. 7.

Next, a structure of the signal controller 600 and an operation of the moving image and the stopped image according to an exemplary embodiment of the present invention will be described.

Figure 9:
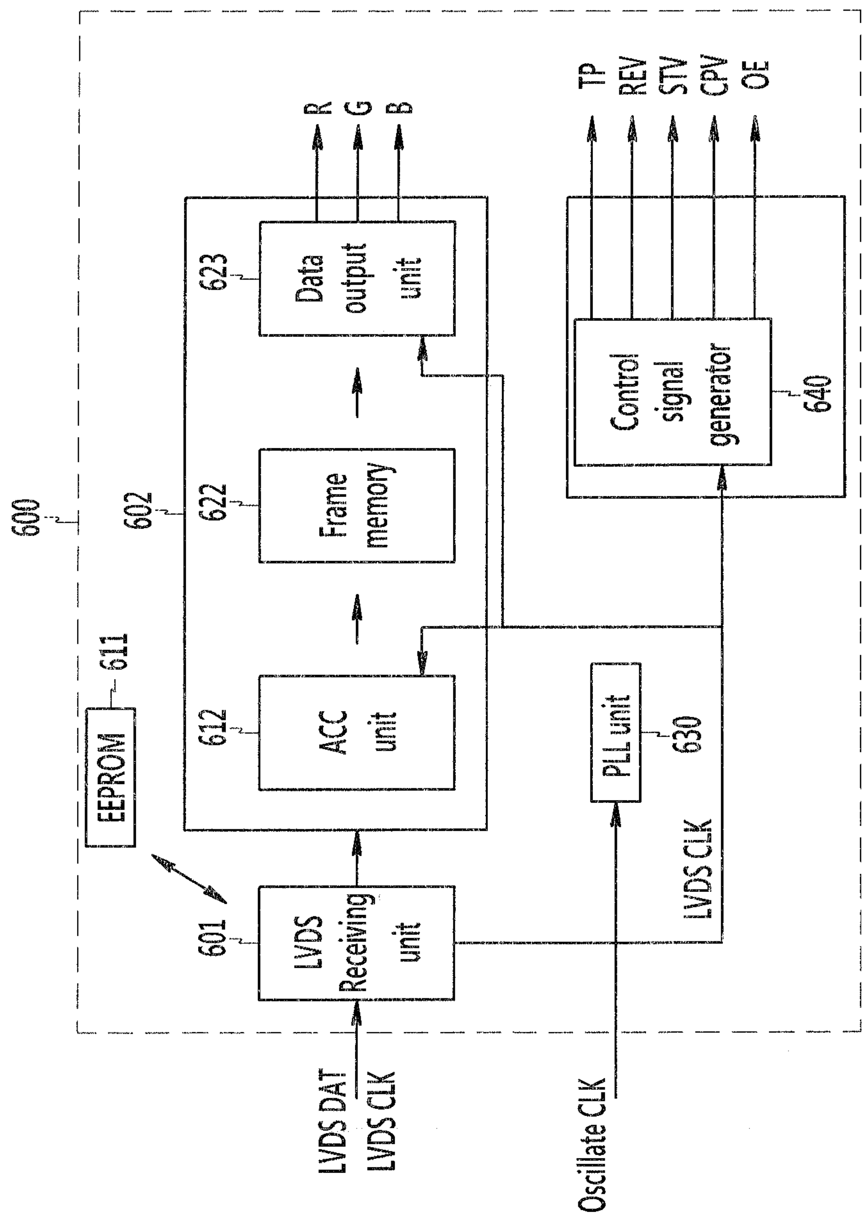
FIG. 9 and FIG. 10 are diagrams illustrating an operation of the display panel board of FIG. 8 for a moving image and a stopped image.
Figure 10:
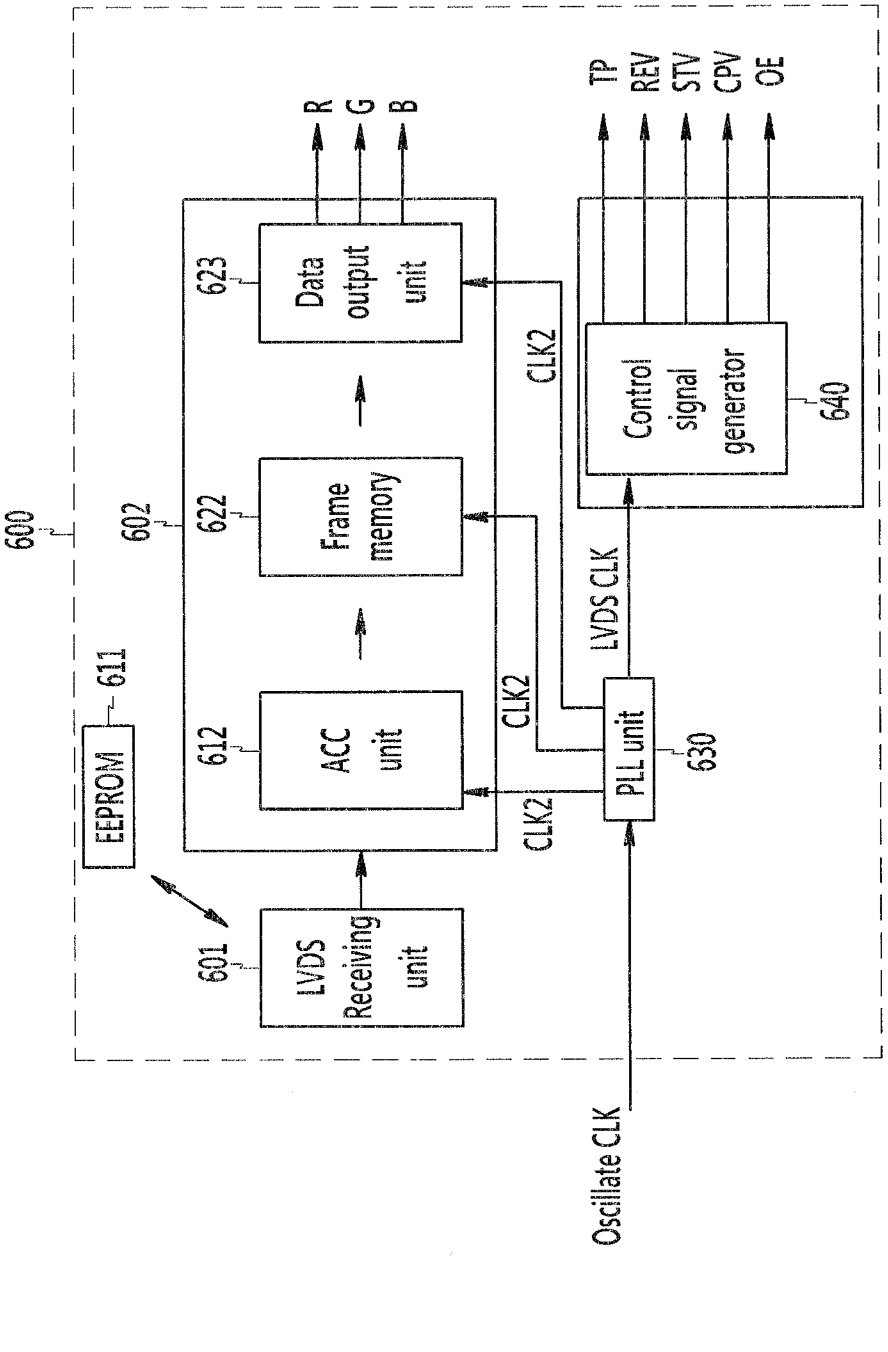

FIG. 8 is a block diagram of a display panel board according to an exemplary embodiment of the present invention, and FIG. 9 and FIG. 10 are diagrams illustrating an operation of the display panel board of FIG. 8 for a moving image and a stopped image.

Different from the signal controller 600 of FIG. 1, in a signal controller 600 according to an exemplary embodiment of FIG. 8 to FIG. 10, the RSDS transmission unit 603 is omitted. However, the output signal in FIG. 8 to FIG. 10 may be output according to the RSDS method.

Referring to the signal controller 600 of FIG. 8, the signal controller 600 includes an LVDS receiving unit 601, a timing controller 602, an electrically erasable programmable read only memory (EEPROM) 611, a phase-locked loop (PLL) unit 630, and a control signal generator 640.

The LVDS receiving unit 601 receives the LVDS data LVDS DAT output from the AD board 650 to divide the DE signal, the VSYNC signal, the HSYNC signal, and the R, G, B image data, and receives the data of the stopped image or the moving image. The divided signal is input to the timing controller 602. In addition, the LVDS receiving unit 601 also receives an LVDS clock signal LVDS CLK, and the received LVDS clock signal LVDS CLK is transmitted to the control signal generator 640 and the timing controller 602.

The EEPROM 611 as a memory for storing the information for the characteristics of the display panel 300 stores information about the resolution or color information according to the characteristics of the display panel 300, and includes the rest of the initialization information of the display panel 300. The information stored in the EEPROM 611 is transmitted to the timing controller 602 through the LVDS receiving unit 601.

The timing controller 602 executes various data processes according to the present exemplary embodiment. For example, an accurate color capture (ACC) for processing the LVDS data LVDS DAT according to the gamma characteristic of the display device and a dynamic capacitance compensation (DCC) process for compensating the LVDS data LVDS DAT according to the difference between the image data of a current frame and the image data of a reference frame to improve the response speed of the liquid crystal panel may be executed.

In the exemplary embodiment of FIG. 8, an ACC unit 612 is shown.

The ACC unit 612 gamma-corrects the RGB data input from the LVDS receiving unit 601 based on a predetermined correction gamma value (stored, for example, in a lookup table for the ACC) according to the gamma characteristic of the display device and outputs the corrected RGB data. In the case of the moving image, the ACC unit 612 receives the LVDS clock signal LVDS CLK and the RGB data from the LVDS receiving unit 601 to process the RGB data according to the LVDS clock signal LVDS CLK.

The RGB data output from the ACC unit 612 is stored in the frame memory 622, and the RGB data stored in the frame memory 622 is continuously displayed on the display panel 300 in the case of the stopped image. The frame memory 622 may not be used when displaying the moving image, and is operated according to the clock signal CLK2 provided from the PLL unit 630 when displaying the stopped image.

The data output from the frame memory 622 is transmitted to a data output unit 623 and is output to the data driver 500. In the moving image case, the data output unit 623 receives the LVDS clock signal LVDS CLK from the LVDS receiving unit 601 and is operated, and in the stopped image case, the data output unit 623 receives the clock signal CLK2 from the PLL unit 630 and is operated.

The PLL unit 630 transmits the clock signal CLK2 to the timing controller 602 to lower the operation frequency when displaying the stopped image. The PLL unit 630 generates the clock signal CLK2 of the low frequency by using an oscillate clock signal CLK transmitted from the outside. The PLL unit 630 according to an exemplary embodiment of the present invention is not operated when displaying the moving image.

The control signal generator 640 generates a control signal according to the LVDS clock signal LVDS CLK and the DE signal transmitted from the LVDS receiving unit 601 in the case of the moving image, and generates the control signal according to the clock signal CLK2 transmitted from the PLL unit 630 in the case of the stopped image. An example of the control signal generated by the control signal generator 640 is a load signal (TP) signal, a reverse signal (REV) signal, a vertical synchronization start (STV) signal, a clock pulse vertical (CPV) signal, and an output enable (OE) signal, and each control signal will be described in FIG. 11 and FIG. 12.

The signal controller 600 according to the exemplary embodiment of FIG. 8 is operated like that shown in FIG. 9 when the moving image signal is input.

In the case of the moving image signal, the LVDS data LVDS DAT and the LVDS clock LVDS CLK are continuously transmitted from the AD board 650 to the signal controller 600 such that the LVDS data LVDS DAT and the LVDS clock signal LVDS CLK are continuously input.

As shown in FIG. 9, the oscillate clock signal CLK is continuously input to the PLL unit 630; however, since the PLL unit 630 is not operated, clock signals are not generated using the oscillate clock signal CLK. FIG. 9 shows that the PLL unit 630 does not produce output, when the moving image signal is input.

On the other hand, the LVDS receiving unit 601 receives the LVDS clock LVDS CLK and transmits it to the control signal generator 640, the ACC unit 612 of the timing controller 602, and the data output unit 623 of the timing controller 602. When displaying the moving image, the frame memory 622 is not necessary such that the LVDS clock signal LVDS CLK is not transmitted to the frame memory 622 and the frame memory 622 is not operated. When displaying the moving image, the clock used in the signal controller 600 is united with the LVDS clock LVDS CLK.

On the other hand, the signal controller 600 according to the exemplary embodiment of FIG. 8 is operated like that shown in FIG. 10 when the stopped image signal is input.

The clock signal transmitted from the PLL unit 630 to the control signal generator 640 has the same frequency as the clock signal used when displaying the moving image, and the clock signal transmitted from the PLL unit 630 to the frame memory 622 has a lower frequency than the clock signal used when displaying the moving image.

For the stopped image, in the AD board 650, the LVDS data LVDS DAT and the LVDS clock signal LVDS CLK are not transmitted to the signal controller 600. As a result, the LVDS receiving unit 601 does not have an input signal such that it is not operated. According to the present exemplary embodiment, the ACC unit 612 does not have the RGB data as input such that it is not operated. The data that is stored in the frame memory 622 is used to display the image. For this purpose, the frame memory 622 is input with the clock CLK2, different from the case of the moving image.

The stopped image is displayed with the clock CLK2 of the frequency lower than the frequency of the clock signal LVDS CLK for displaying the moving image such that there is a decrease in power consumption.

The clock signal CLK2 having the low frequency is generated in the PLL unit 630, and the clock signal CLK2 having the low frequency is generated based on the oscillating clock signal CLK input from the outside.

Therefore, in the PLL unit 630, the clock signal CLK2 having the lower frequency than the clock signal LVDS CLK, which is used in the moving image case, is generated and transmitted to the timing controller 602. As a result, when displaying the stopped image, the clock signal CLK2 of the low frequency is used.

However, the control signals output from the control signal generator 640 are generated according to the frequency of the LVDS clock signal LVDS CLK for displaying the moving image. This is why the PLL unit 630 generates both the LVDS clock signal LVDS CLK and the clock signal CLK2 of the low frequency. The reason that the control signal generated by the control signal generator 640 is not generated according to the clock CLK2 of the low frequency for displaying the stopped image is that the display panel 300 is not charged enough due to the lowering of the frequency of the control signal such that flicker may be increased. An example of this is shown in FIG. 15.

Figure 15:
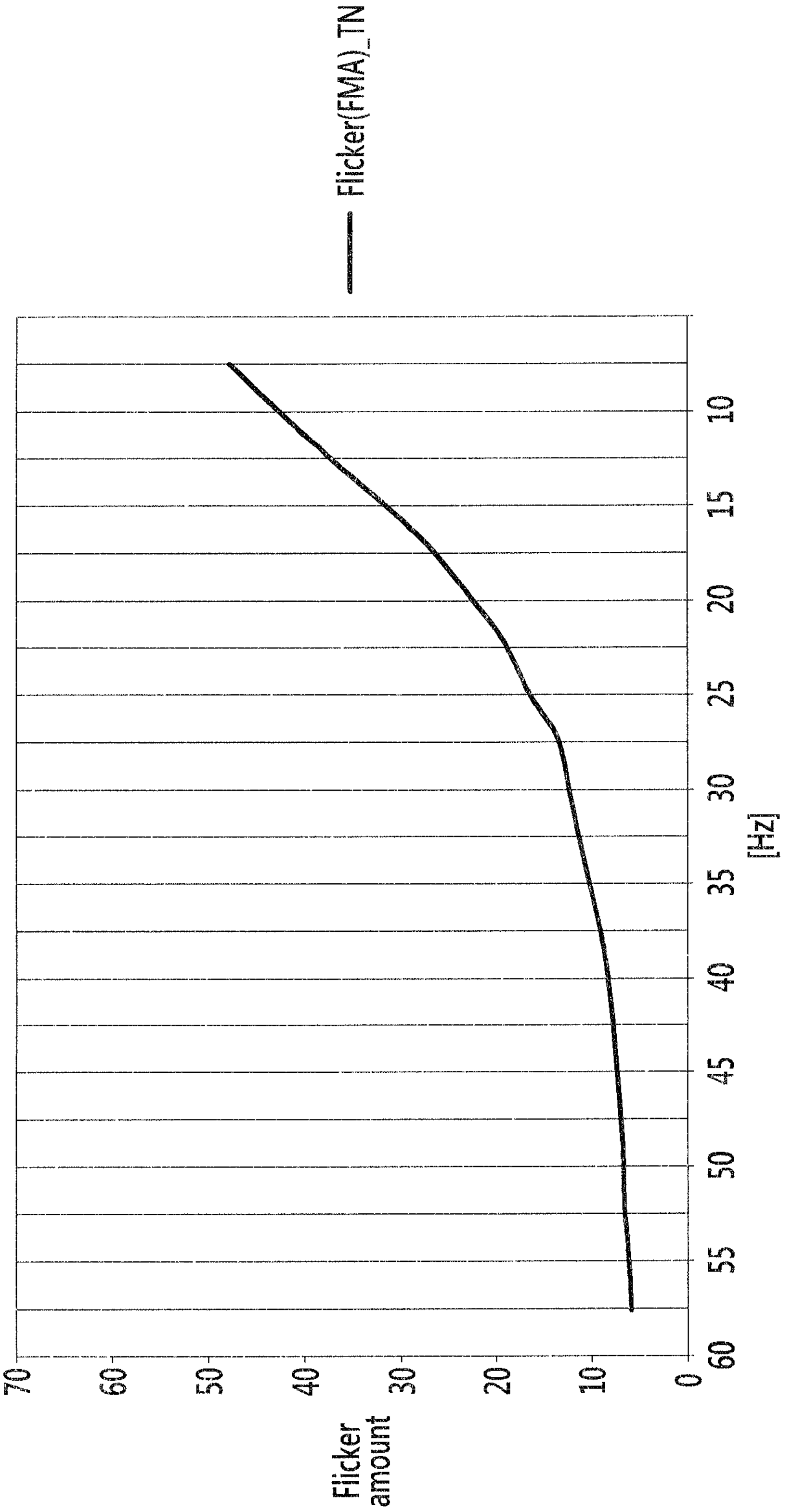
FIG. 15 is a graph of a flicker amount for a driving frequency.

In FIG. 15, the horizontal axis is a driving frequency, and the vertical axis is a flicker amount. The flicker amount is a degree of flicker that is generated by a luminance difference with reference to a predetermined pattern that is weak with regard to flicker. According to FIG. 15, when the driving frequency is low, the flicker is increased, and when the driving frequency is less than about 40 Hz, the flicker amount is over 10 such that the display quality is deteriorated due to the flicker.

Therefore, an original frequency is used as is without decreasing the frequency of the control signal. In addition, due to the change of the driving frequency when changing from the moving image mode and the stopped image mode, the display quality may be deteriorated due to the difference between the driving frequencies such that the driving frequency is constantly maintained in an exemplary embodiment of the present invention.

Next, a method of generating the control signal according to an exemplary embodiment of the present invention will be described with reference to FIG. 11 and FIG. 12.

Figure 11:
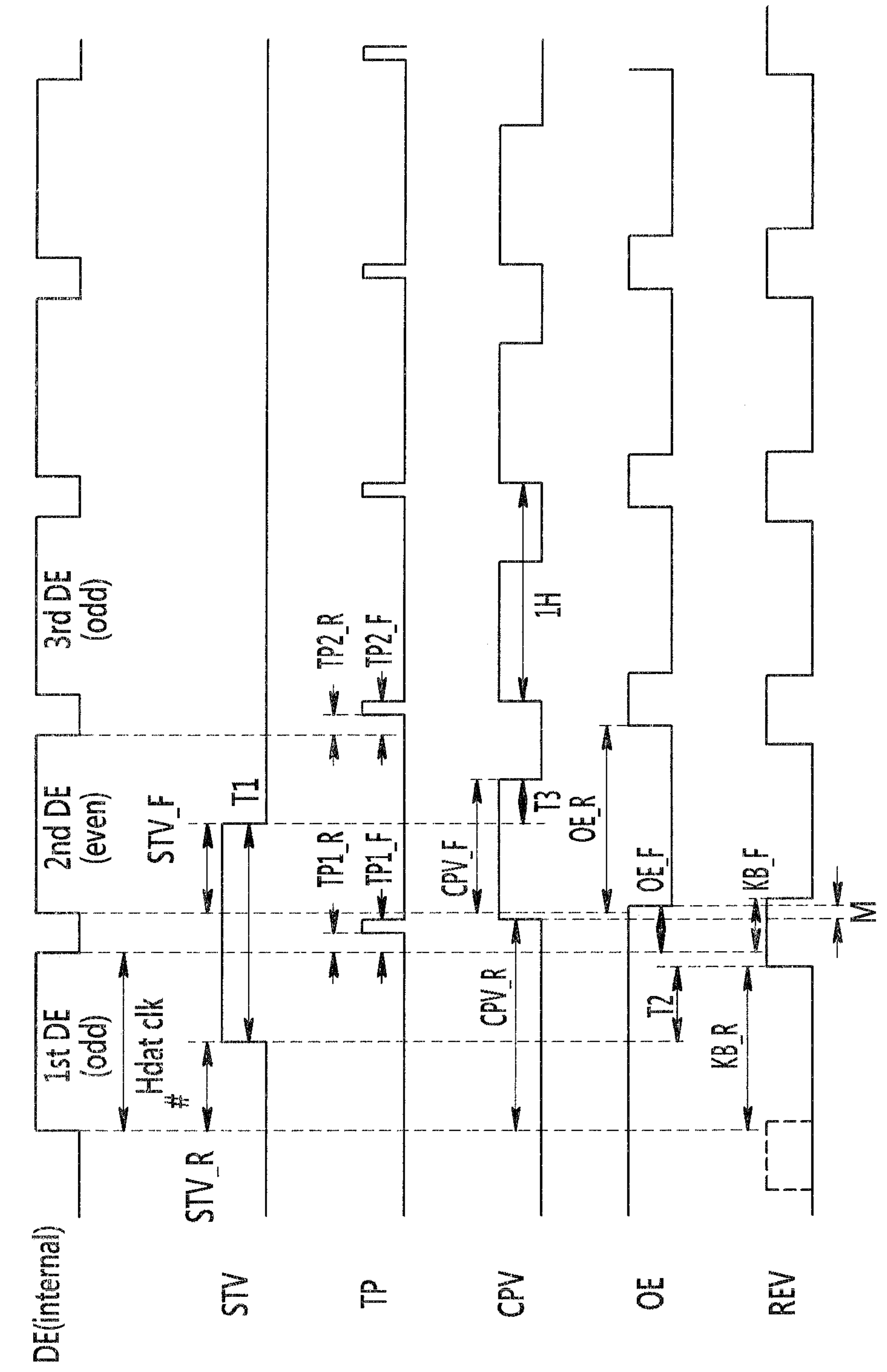
FIG. 11 and FIG. 12 are waveform diagrams of a control signal generated for a moving image and a stopped image in a display panel board according to an exemplary embodiment of the present invention.
Figure 12:
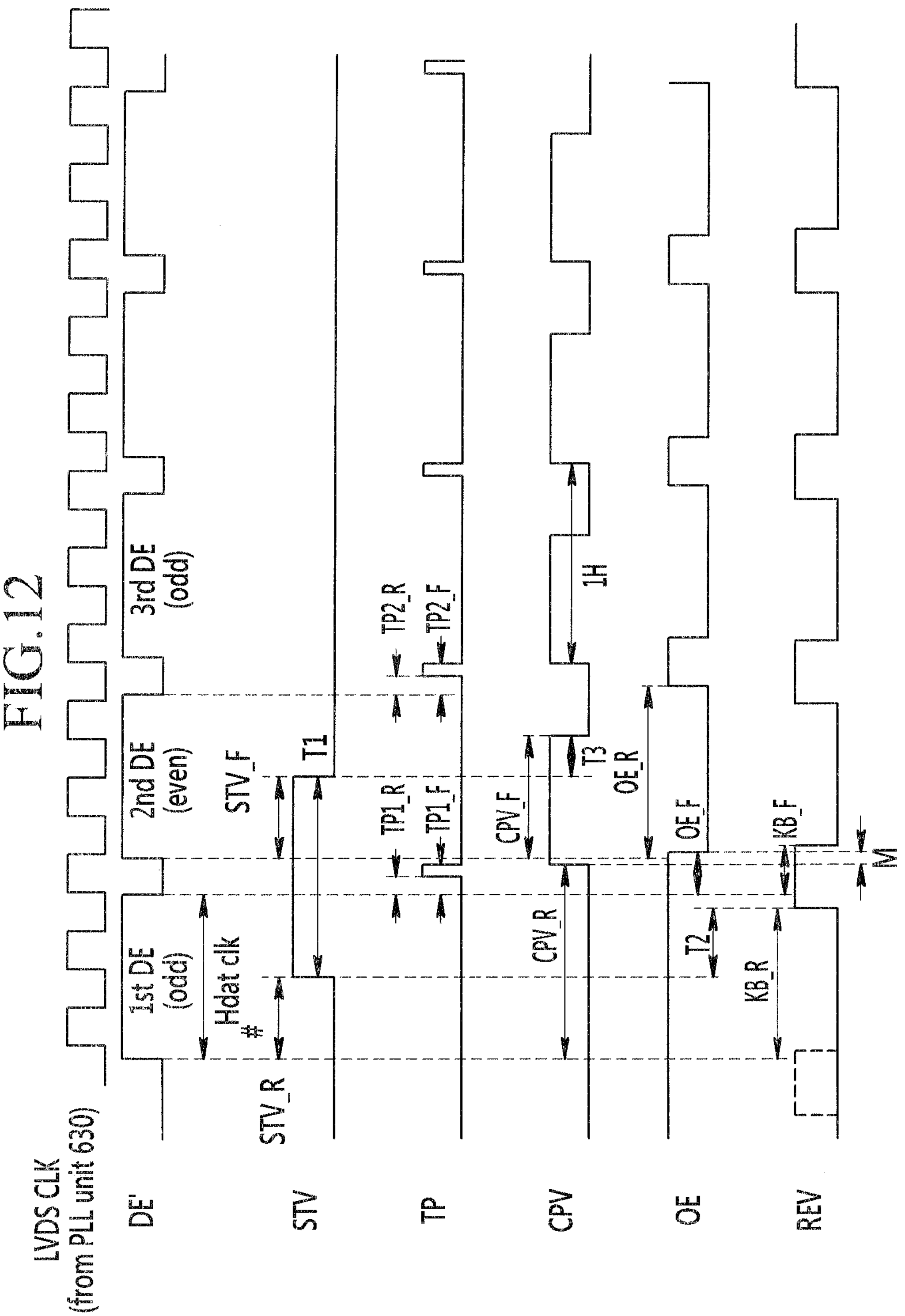

FIG. 11 and FIG. 12 are waveform diagrams of a control signal generated for a moving image and a stopped image in a display panel board according to an exemplary embodiment of the present invention.

FIG. 11 shows a timing diagram in which the control signal generator 640 receives the LVDS clock signal LVDS CLK and the DE signal from the LVDS receiving unit 601 to generate the control signals (e.g., the TP signal, the REV signal, the STV signal, the CPV signal, and the OE signal) when displaying the moving image like that shown in FIG. 9.

According to the DE signal, the STV signal that is to be applied every frame is generated. The rising edge of the STV signal is shown after a time STV_R from the rising edge of the first DE signal, and the falling edge of the STV signal is shown after a time STV_F from the rising edge of the second DE signal.

The rising edge of the TP signal as the enable signal used in the data driver 500 is shown after a time TP1_R from the falling edge of the first DE signal, and the falling edge of the TP signal is shown after a time TP1_F. The TP signal is generated once for every DE signal.

The rising edge of the CPV signal as the enable signal used in the gate driver 400 is shown after a time CPV_R from the rising edge of the first DE signal, and the falling edge of the CPV signal is shown after a time CPV_F from the rising edge of the second DE signal, and the CPV signal is repeated by a cycle of 1 H.

The falling edge of the OE signal as the signal masking the gate voltage output according to the CPV signal is shown after a time OE_F from the falling edge of the first DE signal, and the rising edge of the OE signal is shown after a time OE_R from the rising edge of the second DE signal, and the OE signal is repeated by a cycle of 1 H.

The rising edge of the REV signal as a polarity inversion signal is shown after a time KB_R from the rising edge of the first DE signal, and the falling edge of the REV signal is shown after a time KB_F from the falling edge of the first DE signal.

Here, the values of the STV_R, STV_F, TP1_R, TP1_F, CPV_R, CPV_F, OE_F, OE_R, KB_R, and KB_F may be various according to the characteristics of the display panel used.

As shown in FIG. 11, the DE signal is not transmitted when displaying the stopped image such that the control signal generated when displaying the moving image may not be generated by the above method.

Accordingly, in an exemplary embodiment of the present invention shown in FIG. 12, the DE' signal is generated by using the LVDS clock signal LVDS CLK input from the PLL unit 630, and the control signals (e.g., the TP signal, the REV signal, the STV signal, the CPV signal, and the OE signal) are generated according to the DE' signal. The LVDS clock LVDS CLK input from the PLL unit 630 has the same frequency as the clock signal used when displaying the moving image such that the signal DE' is the same as the signal DE used for displaying the moving image, and thus, the control signals (e.g., the TP signal, the REV signal, the STV signal, the CPV signal, and the OE signal) generated according to the signal DE' are generated in substantially the same fashion as those shown in FIG. 11.

The values of STV_R, STV_F, TP1_R, TP1_F, CPV_R, CPV_F, OE_F, OE_R, KB_R, and KB_F in FIG. 12 may be equal to those shown in FIG. 11, and may be various according to the characteristics of the display panel used.

As described above, when displaying the stopped image, the AD board 650 is not operated such that power consumption is reduced. Further, even though the frame memory 622 is used to display the stopped image, the amount of power consumed by the frame memory 622 is offset by the decrease in the driving frequency used when displaying the stopped image.

Figure 13:
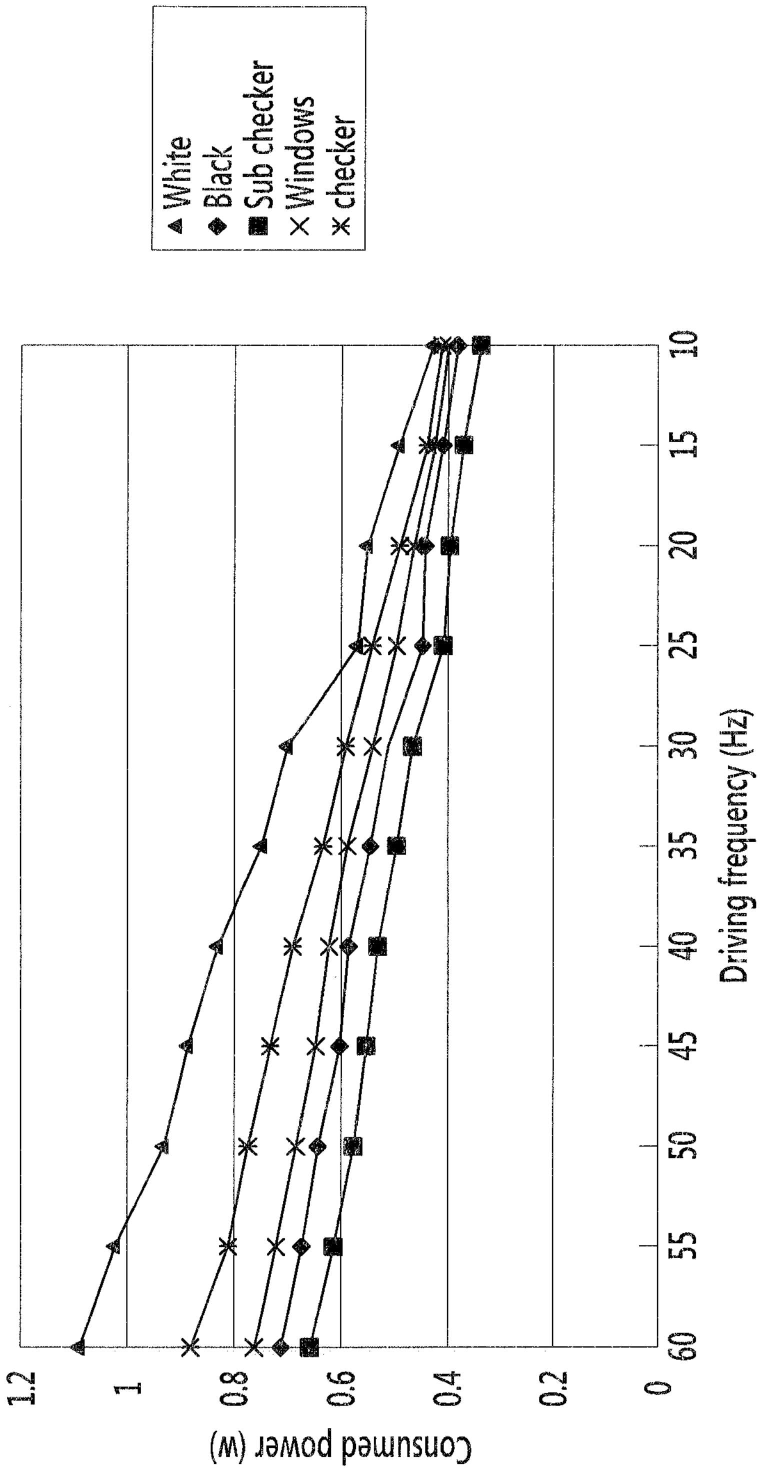
FIG. 13 is a graph showing power consumed according to an exemplary embodiment of the present invention.

The amount of power consumed according to an exemplary embodiment of the present invention is shown in FIG. 13.

Figure 14:
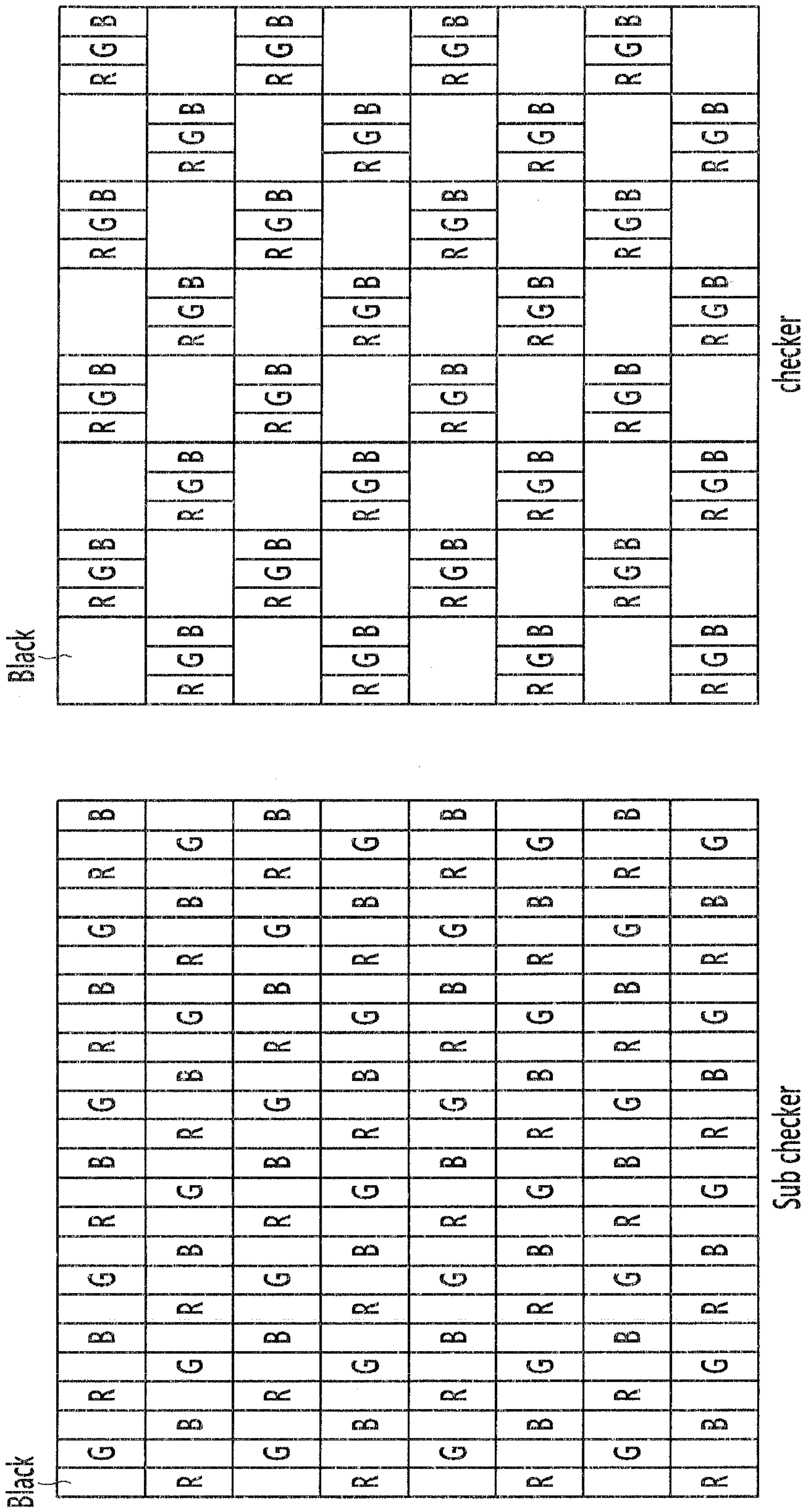
FIG. 14 is a diagram of a display pattern used in FIG. 13.

FIG. 13 is a graph showing power consumption per driving frequency for a display pattern, and FIG. 14 is a view of a display pattern used in FIG. 13.

In FIG. 13, the transverse axis indicates the driving frequency and the vertical axis indicates the amount of power consumption. In FIG. 13, the power consumption is compared for five image patterns, and as the driving frequency is lowered, the power consumption is decreased. The power consumption is high in a case of only displaying white compared with a case of displaying only black, a sub-checker pattern and a checker pattern, for example. Examples of the checker and sub-checker patterns are shown in FIG. 14, where each pattern includes R, G, B, and black.

As shown in FIG. 13, it is possible to reduce power consumption by decreasing the driving frequency; however, the flicker may be increased due to the decrease of the driving frequency as shown in FIG. 15.

Therefore, in an exemplary embodiment of the present invention, the driving frequency may be decreased to about 40 Hz.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:

a display panel including gate lines and data lines;

a gate driver connected to the gate lines;

a data driver connected to the data lines;

a signal controller controlling the display panel, the gate driver, and the data driver, the signal controller including a timing controller and a low voltage differential signaling (LVDS) receiving unit and the timing controller including a frame memory; and an analog-to-digital (AD) board including an LVDS transmission unit, wherein the LVDS transmission unit transmits a signal identifying a stopped image or a moving image to the LVDS receiving unit, and in response to the signal identifying the stopped image, the signal controller maintains the display of the same image on the display panel by using the frame memory, wherein the signal identifying the stopped image uses a combination of at least two of a data enable (DE) signal, a vertical synchronization (VSYNC) signal, and a horizontal synchronization (HSYNC) signal of an LVDS transmission method to identity the stopped image.

2. The display device of claim 1, wherein the signal identifying the stopped image uses a reserved bit of the LVDS transmission method to identify the stopped image.

3. The display device of claim 2, wherein the identification of the stopped image is based on reserved bits in more than two consecutive frames.

4. The display device of claim 1, wherein the identification of the stopped image is based on an overlap of a high period of the VSYNC signal and a high period of the HSYNC signal, or an overlap of a high period of the DE signal, the high period of the VSYNC signal and the high period of the HSYNC signal.

5. The display device of claim 4, wherein when the identification of the stopped image is based on the overlap of the high period of the DE signal, the high period of the VSYNC signal and the HSYNC signal, the signal identifying the stopped image includes data for a frequency of a clock signal that is used when displaying the same image.

6. The display device of claim 1, wherein the signal controller operates the frame memory, when the same image is displayed, by using a first clock signal having a frequency that is lower than the frequency of a second clock signal used when a moving image is displayed on the display panel.

7. The display device of claim 6, wherein the signal controller further includes a phase-locked loop (PLL) unit receiving an oscillating clock signal from an outside source to generate the first clock signal and a third clock signal and a control signal generator generating a control signal.

8. The display device of claim 7, wherein the PLL unit does not operate when the moving image is displayed, and when the same image is displayed, the PLL unit generates the first and third clock signals and the first clock signal is transmitted to the frame memory and the third clock signal is transmitted to the control signal generator.

9. The display device of claim 8, wherein the third clock signal has the same frequency as the second clock signal.

10. A method of driving a display device, comprising:

receiving, at an analog-to-digital (AD) board, a stopped image signal from an outside source, wherein the stopped image signal identifies itself as a stopped image signal;

transmitting a processed version of the stopped image signal from a low voltage differential signaling (LVDS) transmission unit of the AD board to a signal controller; and repeatedly displaying, on a display panel, the same image based on the processed stopped image signal by using a frame memory disposed in the signal controller.

11. The method of claim 10, wherein the processed stopped image signal uses a reserved bit of an LVDS transmission method as its identification.

12. The method of claim 11, wherein the identification of the processed stopped image signal is based on reserved bits in more than two consecutive frames.

13. The method of claim 10, wherein the processed stopped image signal uses a combination of at least two of a data enable (DE) signal, a vertical synchronization (VSYNC) signal, and a horizontal synchronization (HSYNC) signal of an LVDS transmission method as its identification.

14. The method of claim 13, wherein the identification of the processed stopped image signal is based on an overlap of a high period of the VSYNC signal and a high period of the HSYNC signal, or an overlap of a high period of the DE signal, the high period of the VSYNC signal and the high period of the HSYNC signal.

15. The method of claim 14, wherein when the identification of the processed stopped image signal is based on the overlap of the high period of the DE signal, the high period of the VSYNC signal and the high period of the HSYNC the processed stopped image signal includes data for a frequency of a clock signal that is used when displaying the same image.

16. The method of claim 10, wherein when repeatedly displaying the same image, the signal controller operates the frame memory with a first clock signal having a frequency that is lower than a frequency of a second clock signal that is used when displaying a moving image.

17. The method of claim 16, wherein when repeatedly displaying the same image, the signal controller generates a control signal and outputs the control signal to a control signal generator, wherein the control signal has the same frequency as the second clock signal.

18. A display device, comprising:

a display panel displaying an image for a first frame;

a low voltage differential signaling (LVDS) receiving unit receiving LVDS data, wherein the LVDS data includes at least one bit indicating whether the LVDS data is for a still image or a moving image;

a frame memory storing image data corresponding to the displayed image, wherein when the LVDS data is for a still image, the frame memory provides the stored image data to the display panel to maintain the display of the image for a second frame; and a phase-locked loop (PLL) unit providing a first clock to the frame memory and a second clock to a control signal generator in response to the LVDS data for the still image.

19. The display device of claim 18, wherein the first clock has a lower frequency than the second clock.

* * * * *